United States Patent [19]
Pillon et al.

[11] Patent Number: 5,766,513
[45] Date of Patent: Jun. 16, 1998

[54] ANTIFOAMING AGENTS FOR LUBRICATING OILS (LAW455)

[75] Inventors: Lilianna Zofia Pillon, Sarnia; Andre Ernest Asselin, Forest, both of Canada

[73] Assignee: Exxon Research and Engineering Company, Florham Park, N.J.

[21] Appl. No.: 711,617

[22] Filed: Sep. 10, 1996

[51] Int. Cl.$^6$ ..................................... B01D 19/04
[52] U.S. Cl. ............... 252/321; 252/78.3; 252/358; 508/206; 508/469
[58] Field of Search ............... 252/321, 78.3; 508/206, 469

[56] References Cited

U.S. PATENT DOCUMENTS

| | | | |
|---|---|---|---|
| 3,166,508 | 1/1965 | Fields | 508/448 |
| 3,340,193 | 9/1967 | Fields et al. | 508/469 |
| 3,639,260 | 2/1972 | Michalski | 252/321 |
| 4,031,119 | 6/1977 | Ponomarev et al. | 556/448 |
| 4,329,528 | 5/1982 | Evans | 585/3 |
| 4,489,201 | 12/1984 | von Au et al. | 528/42 |
| 4,549,004 | 10/1985 | von Au et al. | 252/321 X |
| 4,626,378 | 12/1986 | Berger et al. | 252/321 |
| 4,719,247 | 1/1988 | Lin et al. | 521/159 |
| 4,900,474 | 2/1990 | Terae et al. | 252/321 X |
| 5,391,314 | 2/1995 | Minemura et al. | 252/78.3 |
| 5,454,979 | 10/1995 | Kobayashi et al. | 252/321 X |

FOREIGN PATENT DOCUMENTS

| | | | |
|---|---|---|---|
| 1064884 | 3/1991 | China | C10N 30/18 |
| 2834172 | 8/1978 | Germany | C08G 77/24 |
| 59105092 | 12/1982 | Japan | C10M 1/50 |
| 2030994 | 4/1980 | United Kingdom | C08F 220/12 |
| 2234978 | 2/1991 | United Kingdom | C08L 83/08 |
| 2244279 | 11/1991 | United Kingdom | B01D 19/04 |

OTHER PUBLICATIONS

"Lubricants and Related Poducts", 9.7 Antifoam Agents, D. Klamann, Verlag Chemie, 1984, p. 210.

"Fluoroalkoxyalkyl functional silicone polymers as foam control for middle distillate fuels", Res. Discl. 1991, 322, 126.

"Interfacial Phenomena in Apolar Media", Eicke & Parfitt, Marcel Dekker, Inc., 1987, pp. 7–8.

*Primary Examiner*—Richard D. Lovering
*Attorney, Agent, or Firm*—Joseph J. Allocca

[57] ABSTRACT

A combination of a fluorosilicone antifoamant and a polyacrylate antifoamant have been found to be effective in reducing foaming of lubricating oils at both low and high temperatures and without degrading the air release time to the extent that would occur with a conventional silicone antifoamant. Neither type of antifoamant is effective in reducing foaming at both low and high temperatures by itself.

4 Claims, 2 Drawing Sheets

ANTIFOAMING AGENTS FOR LUBRICATING OILS (LAW455)

BACKGROUND OF THE DISCLOSURE

1. Field of the Invention

The invention relates to the use of a blend of a fluorosilicone and a polyacrylate to reduce foaming of hydrocarbon oils. More particularly, the invention relates to the use of a combination of both a fluorosilicone and a polyacrylate to reduce foaming in a hydrocarbon oil, including lubricating oils, such as industrial oils and internal combustion engine crankcase oil.

2. Background of the Invention

Lubricating oils (lube oils), including industrial oils and crankcase oils, used in environments in which the oil is subject to mechanical agitation in the presence of a gas entrap the gas in the form of small gas bubbles in the oil and as foam. Crankcase oils used in internal combustion engines represent a typical lube oil application in which the oil is subject to severe mechanical agitation which results in foaming and entrainment of air in the oil. Air entrainment and foaming of a lube oil can result in insufficient lubrication by preventing an effective amount of oil from reaching surfaces which are in need of lubrication. In addition to reducing the useful life of the oil due to enhanced oil oxidation, air entrainment in the oil also results in decreased engine life and increased fuel usage due to the reduced lubrication. Therefore, an antifoaming agent is added to lubricating oils used in such environments to reduce the foaming and air entrainment. Antifoaming agents must be effective over a fairly wide temperature range of from below freezing to temperatures above the boiling point of water, particularly when used with diesel and automotive crankcase oils. Some antifoaming agents eliminate foaming at lower temperatures, but not at higher temperatures and others are more effective at higher temperatures, but not lower temperatures. Increasing the amount of antifoamant may decrease the foaming tendency, but at the same time also increase the air release time of the oil. Silicone oils are known antifoamants and have been used to prevent foaming in a wide variety of lubricating oils, including industrial oils and diesel and automotive crankcase oils. However, while often (but not always) effective in reducing foaming, silicones degrade or increase the air release time of entrained air. Polyacrylates or acrylic polymers are also known antifoamants for oils and are disclosed in, for example, U.S. Pat. No. 3,166,508 and UK patent publication GB 2,234,978 A. Polyaciylates to not degrade the air release time of the oils to the same extent as the silicones do and have therefore replaced silicones in some applications. Unfortunately, polyaciylates are unpredictable in that they are effective with some oils, but not others. Chinese Patent publication CN 1064884-A suggests a combination of a dimethylpolysiloxane silicone oil and what may be some type of aciylate copolymer for internal combustion lubricating oils. Fluorosilicones have been suggested for use as antifoaming agents in outgassing crude oils as disclosed, for example, in U.S. Pat. Nos. 4,329,528 and 4,626,378 and in British patent publication GB 2,244,279 A, but not for industrial or internal combustion engine crankcase oils. There is still a need for an antifoamant, particularly for industrial oils or internal combustion engine crankcase oils, that will operate effectively at both low and high temperatures and without degrading the air release time to the extent that occurs with the use of a silicone antifoamant.

SUMMARY OF THE INVENTION

It has now been discovered that an oil to which has been added both a fluorosilicone fluid and a polyaciylate will exhibit less foaming at both low and high temperatures with little or no air release degradation. Thus, the invention relates to a method for reducing foaming of a hydrocarbon oil by adding a fluorosilicone fluid and a polyacrylate to the oil as antifoamants and to a hydrocarbon oil composition which contains both a fluorosilicone and a polyacrylate as antifoaming agents. The invention has been demonstrated with natural and synthetic hydrocarbon oils of lubricating oil quality of the type useful as industrial lubricating oil and as crankcase oil for internal combustion engines, at both low and high temperatures. By low and high temperatures is meant a temperature of at least as low as 24° C. and at least as high as 93.5° C., respectively, as will be explained in greater detail below. The use of both a fluorosilicone oil and a polyacrylate as antifoaming agents results in an oil exhibiting less foaming and faster air release at both the low and high temperatures than the use of either antifoaming agent by itself. Thus, one embodiment the invention relates to a method for reducing foaming of a hydrocarbon oil which comprises adding a minor amount of a fluorosilicone antifoamant and a polyacrylate antifoamant to said oil. Another embodiment of the invention relates to a lubricating oil comprising a major amount of a hydrocarbon oil having a lubricating quality and a minor, but effective amount of an antifoamant additive which comprises a fluorosilicone antifoamant and a polyacrylate antifoamant. By minor amount is meant less than 1 wt % as is discussed in detail below. In a particular embodiment of the invention the polyacrylate antifoaming agent has a negative spreading coefficient slope while the fluorosilicone has a positive spreading coefficient slope. By positive spreading coefficient slope is meant that the value of the spreading coefficient is higher at a higher temperature than at a lower temperature. Similarly, by negative spreading coefficient slope is meant that the value of the spreading coefficient is lower at the higher temperature than at the lower temperature. This is explained in greater detail below. In another embodiment the invention relates to an antifoamant oil additive for reducing foaming in a hydrocarbon oil which comprises a blend of a fluorosilicone fluid and a polyaciylate and to the use of said blend as an antifoamant in a hydrocarbon oil and particularly in a lubricating oil.

DETAILED DESCRIPTION

Figure 1:
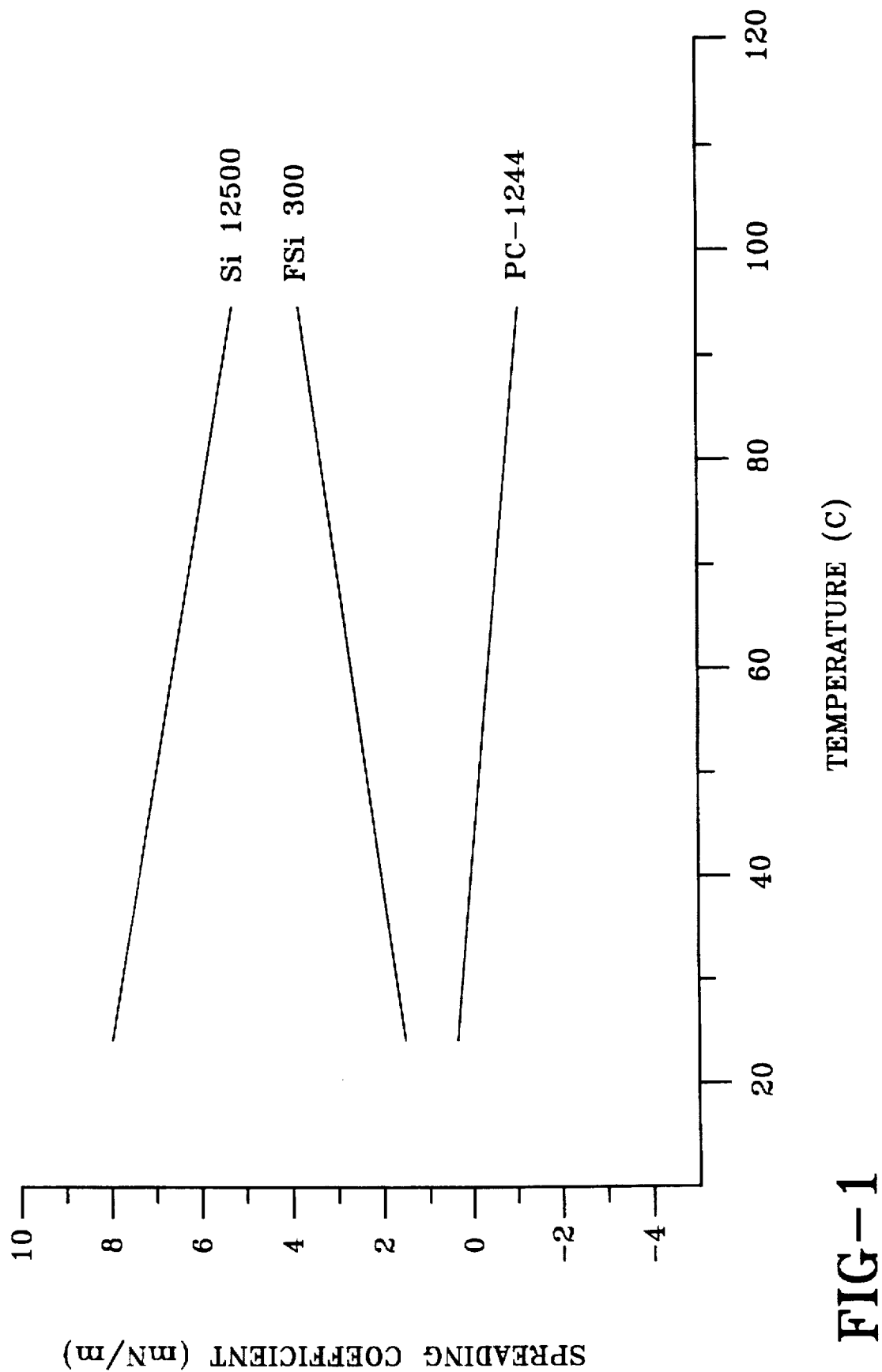
FIG. 1 is a graph showing the effect of temperature on the spreading coefficient of antifoaming agents in a 150N petroleum distillate lube oil base stock.

Those skilled in the art know that silicones have been available for 50 years and that their primary use in petroleum and lubricating oil applications is as antifoaming agents. However, while effective in reducing and eliminating foaming in petroleum derived liquids and other hydrocarbon oils, silicone antifoamants have the disadvantage of degrading the air release properties by increasing the air release time. Table 1 in the Examples below illustrates the use and effect of various grades of silicone antifoamant with a lube oil base stock. Polyacrylates are also known to be useful antifoamants for hydrocarbon oils, but they are not always effective in preventing foaming and can also degrade the air release properties. Degradation of the air release properties is not as severe with polyacrylate antifoaming agents as it is with silicones. This is also illustrated in the Examples below. As set forth above, illustrative, but nonlimiting examples of polyacrylates useful for reducing foaming of oils are disclosed in U.S. Pat. No. 3,166,508 and UK patent publication GB 2,234,978 A. Manufacturers of fluorosilicones recommend them for use in reducing foaming while degassing petroleum crude oils, but not for use as antifoamants for lubricating oils and other hydrocarbon oils. The use of a fluorosilicone, by itself, as an oil antifoamant is not nearly as effective as a conventional silicone fluid as is demonstrated in the Examples below. Silicone fluids used as antifoamants for lubricating and other oils are typically essentially linear polydimethylsiloxane polymers having a chemical composition typically $(CH_3)_3SiO[SiO(CH_3)_2]_nSiCH_3$. As is known to those skilled in the art, these silicone fluids are commercially available from various manufacturers in many different viscosities. The viscosity is a function of the molecular weight. Similarly, polyacrylates are commercially available from several manufactures and the types used as antifoamants are typically polymers and copolymers comprising one or more of ethyl acrylate and 2-ethylhexyl acrylate, along with other monomers as is known to those skilled in the art. In demonstrating the invention in the examples below, a copolymer of ethyl acrylate and 2-ethylhexyl acrylate sold by Monsanto as PC-1244 defoamer was used as the polyaclylate. The fluorosilicone used in demonstrating the invention is available from Dow Coming and is sold for use as a lubricant, a plasticizer for solvent resistant elastomers and as an intermediate, but there is no recommendation that it be used as an antifoamant. This silicone is a fluid available in different viscosities and is sold by Dow as their Dow Corning FS-1265 Fluid. This particular fluorosilicone comprises a fluorinated polysiloxane and the manufacturer describes it as a trimethyl terminated trifluoropropylmethylpolysiloxane. While polyacrylate and fluorosilicone antifoamants can be added directly to the oil, they are more often diluted with a suitable solvent such as kerosene, solvent naphtha, xylene, toluene and the like to form a solution typically containing from about 0.1–90 wt % of the antifoamant.

These two antifoamants are added to the oil in very minor amounts and generally at parts per million (ppm) levels based on the oil content, and typically less than 100 ppm total as demonstrated in the examples below. Thus, the two antifoamants are used in an amount effective to reduce foaming of the oil and are added to the oil in an amount generally ranging from about 1 to 300 ppm of the total composition and more typically from about 10 to 200 ppm and with the weight ratio of the fluorosilicone to the polyacrylate ranging between about 1:150 to 1:5 and more typically from 1:100 to 1:10. These ppm amounts refer to the combined total of both antifoamants, the polyacrylate and the fluorosilicone. As mentioned above, the practice of the invention is effective foam inhibitors when used with natural and synthetic hydrocarbon oils and finds particular application with lubricating oils including industrial and internal combustion engine oils. Brief examples of industrial oils include gear oils, turbine oils, transmission and transaxle fluids, hydraulic fluids and metal working oils and the like. By natural and synthetic oils is meant any suitable hydrocarbonaceous oil derived from petroleum crude oil, tar sands, shale, coal liquefaction, Fischer-Tropsch, wax hydroisomerization and the like as will be appreciated by those skilled in the art. As set forth above, the antifoamant combination or blend of the invention has been demonstrated to be useful and effective as an antifoamant without increasing the air release time above what it is with either the polyacrylate or fluorosilicone used alone in both petroleum distillate fractions which contain significant amounts of polar and aromatic components, in addition to paraffinic and naphthenic (saturates) components, and also with an EXXSYN® premium oil base stock derived from the hydroisomerization of wax which comprises essentially all saturates, with extremely little polar and aromatic components (EXXSYN is a registered trademark of Exxon). The properties of these two different types of hydrocarbon lube oil base stocks are shown in the Examples below. The EXXSYN oil is a premium synthetic oil of a type produced by the hydroisomerization of petroleum oil wax as disclosed in, for example, in U.S. Pat. Nos. 5,059,299 and 5,158,671.

Pure liquids which contain only one type of molecule do not foam and they exhibit rapid release of entrained air. Liquids which contain mixtures of different types of molecules result in the stabilization of thin layers (lamella) of liquid at the air/liquid interface which slows the release of entrained air bubbles, thereby foiming foam. A foamable liquid, such as a lube oil base stock or a lubricating oil composition contains different types of molecules which, when agitated in the presence of air or any other gas, forms a foam and the use of antifoaming agents is required to prevent or at least minimize the foaming. Foaming is generally reduced when a certain relationship between the various surface and interfacial tensions is satisfied. While not wishing to be held to any particular theory, it is believed by those skilled in the art that an antifoaming agent must spread at the air/liquid interface to prevent foaming (c.f., "Interfacial Phenomena in Apolar Media" edited by H. F. Eicke and G. D. Parfitt, Marcel Dekker, Inc. 1987). According to the theory, it will spread spontaneously if the value of the spreading coefficient S is positive, where S is given by $$S = \rho_1 - \rho_2 - \rho_{1,2}$$

wherein $\rho 1$ is the surface tension of the foamy liquid, $\rho_2$ is the surface tension of the foam-inhibiting or antifoaming agent, and $\rho_{1,2}$ is the interfacial tension between them. These surface tension and interfacial tension values are easily measured using a ring type tensiometer, such as a du Nouy Tensiometer or equivalent, following the procedure of ASTM D 1331-89, "Surface and Interfacial Tension of Solutions of Surface-Active Agents". If S is negative, the antifoaming agent may enter the ail/liquid interface without spreading or it may not even be able to enter the interface, in which case foam inhibition is greatly reduced or does not occur at all. This can happen if the value of the surface tension of the antifoaming agent $(\rho_2)$ or the value of the interfacial tension between the antifoaming agent and the foamy liquid $(\rho_{1,2})$ or both, is greater than the value of the surface tension of the foamy liquid $(\rho_1)$. An antifoamant which has a negative spreading coefficient (S) is therefore unpredictable as to whether or not it will prevent foaming. Other factors such as solubility and dispersion can have a major effect on whether or not foaming is suppressed. Indeed, it has been found that even an antifoamant with a positive spreading coefficient can be unpredictable in preventing foaming. Thus, theory and reality are not always the same and the application of theory to solve practical problems, such as preventing foaming, is not at all predictable. By way of an illustrative, but nonlimiting example, a particular polyacrylate useful as one of the two antifoamants in the practice of the invention has a positive spreading coefficient at 24° C., but a negative spreading coefficient at a temperature of 93.5° C. in petroleum distillate fraction lube oil base stocks. In a premium lube oil base stock derived by isomerizing wax obtained from a petroleum distillate fraction it has a negative spreading coefficient at both 24° C. and 93.5° C. In both types of oils the spreading coefficient slope is negative for this polyacrylate. In contrast, the spreading coefficients of both the fluorosilicone fluid useful in the practice of the invention and conventional silicone antifoamants are positive at both the low and high temperatures in both types of base stocks. Yet, it is only the combination of the fluorosilicone with the polyacrylate that has been found useful as an antifoamant in the practice of the invention. Combinations of polyacrylate with conventional silicone antifoamants useful for suppressing foaming of lubricating oils have not proved satisfactory, nor have combinations of conventional silicone antifoamant used for lubricating oils and a fluorosilicone. Thus, the effectiveness of the combination of the invention is unexpected. The polyacrylate and fluorosilicone antifoamants combination useful in the practice of the invention the invention has prevented foaming of lubricating oils at both the low and high temperatures with less air release degradation than is experienced with either component used by itself The invention will be further understood with reference to the examples below.

EXAMPLES

In all of the examples, the 150N base oil is a paraffinic hydrocarbon oil distillate derived from a petroleum crude oil of a lubricating oil quality and boiling in the lube oil range. The EXXSYN base oil is a high VI, synthetic hydrocarbon oil derived by the hydroisomerization of a hydrocarbon wax and is a premium lube oil base stock as is explained in greater detail above. The composition and physical properties of these two lube oil base stocks are set forth in the table below.

| Base Oil Property | 150N | EXXSYN |
|---|---|---|
| Viscosity, cSt | | |
| @ 40° C. | 29.60 | 31.35 |
| @ 100° C. | 4.99 | 5.96 |
| Viscosity Index | 90 | 138 |
| Saturates, wt % | 79.9 | >99.5 |
| Aromatics/Polars, wt % | 20.1 | <0.5 |
| Sulphur, wt %/ppm | 0.12 wt % | 17 ppm |
| Total Nitrogen, ppm | 66 | 2 |
| Basic Nitrogen, ppm | 53 | 0 |
| Surface Tension, mN/m @ 24° C. | 33.7 | 32.8 |

The difference in the surface tension value of the two oils is a significant difference caused by the difference in composition and kinematic viscosity. The foaming tendency of the oils in all of the examples below was measured using the ASTM D 892 foam test at the temperatures of 24° C. (Seq. I foam test) and 93.5° C. (Seq. II foam test). The Seq. III test was also used and this test involves heating the sample to 93.5° C., followed by cooling down and testing at 24° C. An in-line air flow meter was used to control the air flow rate for the ASTM D 892 tests at 94.0 mL/min., instead of the 94±5 mL/min. permitted by the test, in order to improve the repeatability of the tests. A metal air diffuser was also used. The ASTM D 3427 method for gas bubble separation time of petroleum oil was used for determining the air release time of the oils in all of the examples below. This method is intended to determine the ability of a petroleum type steam turbine oil to separate entrained gas. This testing was carried out at a temperature of 50° C. The spreading coefficient of the antifoamants in the two base oils was determined by measuring the suiface tension of each antifoaming agent, the suiface tension of the base oils and the interfacial tension between the oil and the antifoaming agent using the method in ASTM D 1331-89 "Surface and Interfacial Tension of Solutions of Surface-Active Agents" and applying the results to the spreading coefficient equation as explained under the Detailed Description.

EXAMPLE 1

In this experiment, Dow Corning 200 Fluid silicon oil antifoaming agent at three different viscosities was added to the 150N base stock at various concentrations and the oils then tested for foaming tendency and stability, as well as for air releas time. The silicone oils were used undiluted, or 100% active. The results of this experiment are in Table 1 below in which the Seq. I and Seq. III tests were conducted at 24° C., while the Seq. II tests were conducted at 93.5° C.

TABLE 1

| Silicones | Treat Rate (ppm) | Foaming Tendency/Stability mL/mL | | | Air Release (min/50° C.) |
|---|---|---|---|---|---|
| | | Seq. I | Seq. II | Seq. III | |
| 150N base oil | 0 | 280/0 | 20/0 | 240/0 | 2.1 |
| 150N/Si 350 cSt | 1 | 35/0 | 30/0 | 290/0 | 5.2 |
| | 2 | 5/0 | 25/0 | 10/0 | 6/3 |
| | 3 | 10/0 | 35/0 | 10/0 | 6.2 |
| 150N/Si 12500 cSt | 1 | 45/0 | 10/0 | 45/0 | 4.2 |
| | 2 | 0/0 | 10/0 | 5/0 | 5.0 |
| | 3 | 0/0 | 10/0 | 5/0 | 5.5 |
| 150N/Si 60000 cSt | 1 | 65/0 | 10/0 | 15/0 | 3.2 |
| | 2 | 5/0 | 10/0 | 15/0 | 4.2 |
| | 3 | 25/0 | 15/0 | 25/0 | 5.5 |

It is a known fact that air release time of base oils gradually increases with an increase in treat rates of antifoaming agents. While silicones are effective in preventing foaming at low treat rates, they gradually degrade (increase) air release time as shown above . According to these results, the most effective silicone fluid with the 150N base oil was the one having the 12500 cSt viscosity. However, at the treat rate of 2 ppm, the 12500 cSt viscosity silicone eliminated the foming tendency of the base oil at 24° C., but it only decreased the foaming tendency frim 20 to 10 mL at the higher, 93.5° C. temperature.

EXAMPLE 2

These experiments were similar to those in Example 1 in using the 150N base oil and the same tests. In this case, a different batch (than the one on Tables 1 and 3) of 150N base oil with different foaming and air release characteristics was used. Antifoaming agents other than the Si 12500 cSt silicone fluid were evaluated. These antifoaming agents included an acrylic copolymer PC-1244 obtained from Monsanto and a fluorinated silicone fluid, Dow Corning FS-1265 having a viscosity of 300 cSt. The 300 cSt Dow Corning FS-1265 fluorosilicone fluid is hereinafter referred to as "FSi 300" in this example and in the examples that follow below. The chemistry of these materials is explained in detail under the Detailed Description above. The results, set forth in Table 2 below, clearly demonstrate that the polyaciylate antifoaming agent PC-1244, even at such treat rates as high as 40 ppm, increases the air release time of the 150N base oil from 1.6 min. to only 2.2 min., thereby showing less degradation in air release than the silicones. However, while the PC-1244 was found to be effective in preventing foaming at the lower 24° C. temperature (Seq. I test), it was not effective in preventing foaming at the higher 93.5° C. temperature (Seq. II test). Contrary to the PC-1244, the 300 cSt fluorosilicone antifoaming agent, FSi 300, was found not effective at the 24° C., but it was partially effective in preventing foaming at the higher 93.5° C. temperature in reducing the foaming tendency of the 150N base oil from 30 mL to 15 mL in the presence of 3 ppm of FSi 300.

TABLE 2

| Antifoaming Agents | Treat Rate (ppm) | Foaming Tendency/Stability, mL/mL | | Air Release (min/50° C.) |
|---|---|---|---|---|
| | | Seq. I (24° C.) | Seq. II (93.5° C.) | |
| 150N Base Oil | 0 | 345/0 | 30/0 | 1.6 |
| 150N/PC-1244 | 40 * | 5/0 | 30/0 | 2.2 |
| 150N/FSi 300 | 3 | 170/0 | 15/0 | 3.7 |
| 150N/PC-1244/FSI 300 | 40 */3 | 0/0 | 15/0 | 2.6 |

* 100 ppm of 40% solution as supplied by the manufacturer.

As a result of these experiments, a blend of the PC-1244 polyacrylate antifoaming agent and the 300 cSt fluorosilicone antifoaming agent, FSi 300 was evaluated for antifoaming properties. These results are also illustrated in Table 2 above and show that the blend or combination of both the polyacrylate and fluorosilicone antifoaming agents prevented foaming in the 150N base oil at the lower 24° C. temperature and slightly decreased it at the higher 93.5° C. temperature. It also shows that the blend resulted in an air release time less than the 3.7 min. experienced with the use of just the FSi 300 fluorosilicone, even though it still contained 3 ppm of the FSi 300. This decrease in the air release time was unexpected.

EXAMPLE 3

This set of experiments was similar to those in Examples 1 and 2 in using the 150N base oil and the same tests. However, the combination of the polyacrylate and the fluorosilicone antifoaming agents, PC-1244/FSi 300, was modified as to amounts in an attempt to eliminate the foaming tendency of the 150N base oil at the higher 93.5° C. temperature. The 150N base oil used in these experiments was from the same batch used for Example 1, but different from the batch used in Example 2. The results are displayed in Table 3 below, along with those from Table 1 for the Si 12500 at the 2 ppm treat rate level as a comparison.

TABLE 3

| Silicones | Treat Rate (ppm) | Foaming Tendency/Stability mL/mL | | | Air Release (min/50° C.) |
|---|---|---|---|---|---|
| | | Seq. I | Seq. II | Seq. III | |
| 150N base oil | 0 | 280/0 | 20/0 | 240/0 | 2.1 |
| 150N/Si 12500 | 2 | 0/0 | 10/0 | 5/0 | 5.0 |
| 150N/PC-1244 | 80* | 0/0 | 20/0 | 0/0 | 3.2 |
| 150N/Fsi 300 | 3 | 300/0 | 0/0 | 265/0 | 4.3 |
| 150N/PC-1244/ FSi 300 | 80*/3 | 0/0 | 0/0 | 0/0 | 3.1 |

*200 ppm of 40% solution.

These results confirm the results obtained in Example 2 in that the acrylic polymer, PC-1244 was an effective antifoamant at 24° C. (Seq. 1), but not as effective at the higher 93.5° C. (Seq. II) temperature and slightly degraded (increased) the air release time of the base oil. In this regard, it was not dissimilar to the Si 12500 silicone oil antifoamant. In contrast however, the fluorosilicone fluid FSi 300 was effective as an antifoamant at the 93.5° C. temperature, but not at the lower 24° C. temperature. The combination of 80 ppm (active) of PC-1244 and 3 ppm of FSi 300 was found to have totally eliminated foaming of the 150N base oil at both temperatures of 24° C. and 93.5° C. As was the case in the experiment in Example 2, there was again an unexpected improvement in air release of the 150N base oil compared to the air release time for both the PC-1244 and FSi 300 as single additives.

EXAMPLE 4

The tests in this example were essentially the same as those of Examples 1, 2 and 3, but in these tests the premium EXXSYN base oil (SWI) was used instead of the 150N. The results of the tests are set forth in Table 4 below. As the Table shows, the exceptional performance of the PC-1244/FSi 300 blend in preventing foaming at both the low and high temperatures of 24° C. and 93.5° C. and improving the air release time was further confirmed in the EXXSYN base oil.

TABLE 4

| Antifoaming Agents | Treat Rate (ppm) | Foaming Tendency/Stability, mL/mL | | Air Release (min/50° C.) |
|---|---|---|---|---|
| | | Seq. I (24° C.) | Seq II (93.5° C.) | |
| SWI Base Oil | 0 | 340/0 | 25/0 | 1.0 |
| SWI/Si 12500 | 3 | 0/0 | 0/0 | 2.8 |
| SWI/PC-1244 | 60 * | 135/0 | 15/0 | 1.0 |
| SWI/FSi 300 | 3 | 35/0 | 0/0 | 1.1 |
| SWI/PC-1244/FSi 300 | 60 */3 | 0/0 | 0/0 | 1.0 |

* 150 ppm of 40% solution.

As shown in Table 4, 3 ppm of Si 12500 is effective in preventing the EXXSYN base oil from foaming at both the high and low temperatures of 24° C. and 93.5° C., but the air release is degraded as seen by the significant increase in time of from 1.0 min to 2.8 min. With only the PC-1244 polyaciylate antifoaming agent, the air release time was not degraded, but the foaming tendency of the base oil wasn't completely eliminated as it was with the PC-1244/FSi 300 blend. The fluorosilicone fluid eliminated foaming of the base oil at the higher temperature of 93.5° C., but not at the 24° C. lower temperature. It is interesting to note that the reduction in foaming with the FSi 300 was substantially greater for the EXXSYN base oil that it was for the 150N base oil. It is only with the combination of the polyacrylate and fluorosilicone antifoaming agents that the foaming tendency of the base oil was totally eliminated at both low and high temperatures, with no increase in air release time.

EXAMPLE 5

The idea of blending two different antifoaming agents to prevent foaming at the low (24° C.) and high (93.5° C.) temperatures and to improve or at least not increase the air release time of lubricating oils was extended to Si 12500/FSi 300 blends with both the 150N base oil and the premium EXXSYN base oil. The results are shown in Table 4 below which compares the Si 12500/FSi 300 blends with results obtained with the Si 12500 and FSi 300 used singly. As the results show, in both cases of the 150N and EXXSYN base oils, not only was there no improvement in air release time when using the blend of the Si 12500 and FSi 300 antifoaming agents, the air release time actually increased over the value for the base oils without them.

TABLE 5

| Antifoaming Agents | Treat Rate (ppm) | Foaming Tendency/Stability, mL/mL | | Air Release (min/50° C.) |
|---|---|---|---|---|
| | | Seq. I (24° C.) | Seq. II (93.5° C.) | |
| 150N/Si 12500 | 2 | 0/0 | 10/0 | 5.0 |
| 150N/FSi 300 | 3 | 300/0 | 3/0 | 4.3 |
| 150N/Si12500/FSi300 | 2/3 | 10/0 | 5/0 | 5.3 |
| EXXSYN/Si 12500 | 3 | 0/0 | 0/0 | 2.8 |
| EXXSYN/FSi 300 | 3 | 35/0 | 0/0 | 1.6 |
| EXXSYN/Si 12500/FSi 300 | 3/3 | 0/0 | 0/0 | 4.0 |

These results clearly demonstrate the uniqueness of the blend of polyacrylate and fluorosilicone (PC-1244/FSi 300) antifoaming agents in terms of preventing foaming at both the low and high temperatures and having improved or no effect on the air release time of the base oils.

EXAMPLE 6

In this example, an unfluorinated silicone antifoaming agent used in automotive crankcase lube oil compositions, the Si 12500, was blended with the polyacrylate antifoaming agent, PC-1244, and compared with the PC-1244/FSi 300 and the Si 12500/FSi 300 blends with the 150N base oil. The results are displayed in Table 6 below and clearly demonstrate the uniqueness of the polyacrylate/fluorosilicone combination again. Comparing these results with the results in the Tables above again shows that only the blend of the polyacrylate and fluorosilicone (PC-1244/FSi 300) completely eliminates the foaming and with less air release degradation than the polyacrylate, silicone or fluorosilicone used singly. It is clearly superior to both the silicone and fluorosilicone blend (Si 12500) and the silicone and polyacrylate (Si 12500/PC-1244) blend.

TABLE 6

| Antifoaming Agents | Treat Rate (ppm) | Foaming Tendency/Stability, mL/mL | | Air Release (min/50° C.) |
|---|---|---|---|---|
| | | Seq. I (24° C.) | Seq. II (93.5° C.) | |
| 150N Base Oil | 0 | 340/0 | 25/0 | 1.0 |
| Si 12500/FSi 300 | 2/3 | 10/0 | 5/0 | 5.3 |
| Si 12500/PC-1244 | 2/80 * | 0/0 | 10/0 | 4.4 |
| FSi 300/PC-1244 | 3/80* | 0/0 | 0/0 | 3.1 |

* 200 ppm of 40% solution.

EXAMPLE 7

This experiment was basically a repeat of that in Example 6, except that the premium EXXSYN base oil was used. The results set forth in Table 7 below are repetitive of the results for the 150N base oil in Table 6 above in once again demonstrating the unique superiority of the polyacrylate and fluorosilicone combination in preventing foaming at both the low and high temperatures with no degradation in air release.

TABLE 7

| Antifoaming Agents | Treat Rate (ppm) | Foaming Tendency/Stability, mL/mL | | Air Release (min/50° C.) |
|---|---|---|---|---|
| | | Seq. I (24° C.) | Seq. II (93.5° C.) | |
| EXXSYN Base Oil | 0 | 170/0 | 25/0 | 1.0 |
| Si 12500/FSi 300 | 3/3 | 0/0 | 0/0 | 4.0 |
| Si 12500/PC-1244 | 3/60 * | 20/0 | 5/0 | 2.5 |
| FSi 300/PC-1244 | 3/60* | 0/0 | 0/0 | 1.0 |

* 150 ppm of 40% solution.

EXAMPLE 8

Figure 2:
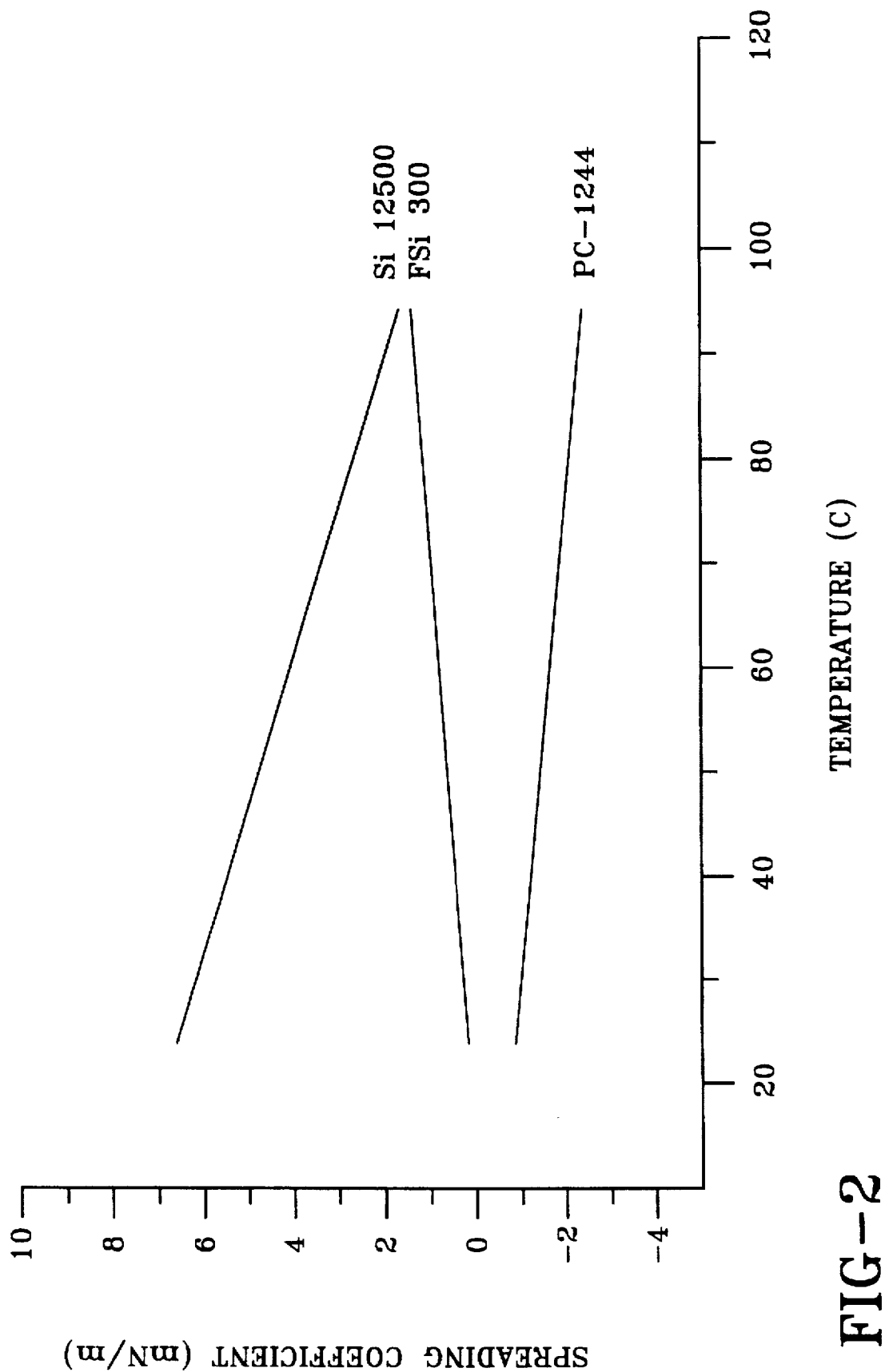
FIG. 2 is a graph showing the effect of temperature on the spreading coefficient of antifoaming agents in a premium, synthetic lube oil base stock.

The spreading coefficients of the Si 12500 silicone fluid, the FSi 300 fluorosilicone fluid and the PC-1244 polyacrylate fluid in both the 150N oil and the premium EXXSYN oil were measured at both the low and high temperatures of 24° C. and 93.5° C. using the ASTM D 1331-89 test referred to above. The results are shown in FIG. 1 for the 150N lube oil base stock and in FIG. 2 for the premium EXXSYN lube oil base stock. Both of these Figures show that the spreading coefficient for both the Si 12500 silicone fluid and the FSi 300 fluorosilicone fluid have positive values. However the spreading coefficient increased with increasing temperature for the FSi 300 and decreased with increasing temperature for the Si 12500. The polyacrylate antifoamant PC-1244 is shown as having a negative spreading coefficient at both temperatures in the EXXSYN oil, being more negative at the higher than at the lower temperature, which is similar to that of the Si 12500. FIG. 1 shows that the value of the spreading coefficient for the PC-1244 in the 150N oil is slightly positive at the low temperature, with a negative value at the higher temperature.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A method for reducing foaming of a hydrocarbon oil at both low and high temperatures and without degrading the air release time to the extent that would occur with a silicone antifoamant which comprises adding a minor amount of a combination fluorosilicone antifoamant and a polyacrylate antifoamant to said oil, the combination being used in an amount of less than 1 wt % based on said oil and the weight ratio of the fluorosilicone antifoamant to the polyacrylate antifoamant ranging between about 1:150 to 1:5.

2. A method according to claim 1 wherein the total amount of said antifoamants added to said oil ranges from about 1 to 300 ppm.

3. A method according to claim 2 wherein said fluorosilicone antifoamant exhibits a positive spreading coefficient slope in said oil and said polyacrylate antifoamant exhibits a negative spreading coefficient slope in said oil.

4. A method according to claim 3 wherein said fluorosilicone antifoamant comprises a fluorinated polysiloxane.

* * * * *